United States Patent
Giers et al.

[11] 3,754,801
[45] Aug. 28, 1973

[54] SUBSTANTIALLY RIGID BEARING MOUNTING FOR ROTARY BODIES

[75] Inventors: Alfred J. Giers, Rossdorf; Friedhelm Widmann, Gross-Zimmern; Manfred Heiland, Hahn/Pfungstadt, all of Germany

[73] Assignee: Firma Carl Schenck Maschinenfabrik GmbH, Darmstadt, Postfach, Germany

[22] Filed: Nov. 15, 1971

[21] Appl. No.: 198,691

[30] Foreign Application Priority Data
Aug. 19, 1971 Germany.................. P 21 41 502.1

[52] U.S. Cl. .................................................. 308/15
[51] Int. Cl. .............................................. F16c 35/00
[58] Field of Search ........................................ 308/15

[56] References Cited
UNITED STATES PATENTS
2,869,936  1/1959  Federn................................. 308/15
3,174,810  3/1965  Roubal................................. 308/15

Primary Examiner—Charles J. Myhre
Assistant Examiner—Barry Grossman
Attorney—W. G. Fasse

[57] ABSTRACT

A substantially rigid bearing mounting for rotary bodies, especially for balancing machines comprises, in addition to the main supporting rods, sets of auxiliary supporting means which are controllable, for example, by a piston cylinder arrangement to vary their frictional force transmitting ability, whereby the resonant frequency of the entire structure may be varied or controlled.

4 Claims, 3 Drawing Figures

SUBSTANTIALLY RIGID BEARING MOUNTING FOR ROTARY BODIES

BACKGROUND OF THE INVENTION

The present invention relates to a substantially rigid bearing mounting for rotary bodies, more specifically such mountings are used in connection with the bearings of balancing machines.

Apparatus in which a rotating body, such as a rotor, may bend substantially in a radial direction in response to critical revolutions per minute, require supprting means for the rotor which are capable of following such rotor movement or deflections in order to avoid harmful wedging forces between the shaft of the rotor and the bearing means. This is especially true in connection with balancing machines on which longitudinal bodies are to be tested or examined and which bodies have elastically yielding shafts.

It is known to provide rotor bearings which are substantially rigid in radial directions but which permit the tumbling or wobbling movements of the rotary axis of the rotor which movements result from deflections of said axis. These bearings are constructed to be rigid in radial directions as well as without play but elastically yielding in a spherical sense. Stated differently, these known bearings permit bearing movements about the vertical and horizontal axes. Each bearing or rather each supporting structure comprises a system of spring rods for the radial support, whereby the spring rods are located in a plane extending through the bearing center and perpendicularly to the bearing main axis. The spring rods of each system extend in parallel to each other and preferably at equal spacings from the bearing main axis. These rods are rigid relative to tensile stress, pressure, and buckling forces, however, the rods comprise one or several sections which are flexible or bendable relative to lateral forces. These rods secure the bearing housing against rotation about the bearing main axis and support the bearing housing with equal restraint in all radial directions relative to a base or foundation. Nevertheless, the rods permit said tumbling or wobbling motions of the rotational axis of the rotor relative to two freedom degrees, that is relative to two axis extending perpendicularly to each other and through the center of the bearing proper.

Apparatus as described above is, for example, known from German Pat. No. 1,045,736. These prior art arrangements are constructed so as to have a predetermined stiffness or rigidity in radial direction whereby the system comprising the body to be tested and the bearing mounting has individual and predetermined, discrete resonance frequencies which cannot be influenced once the construction of the arrangement is completed. As a result, even dangerous deflections may occur in the balancing machine due to resonance amplification when during a test, the rotating body passes through such resonance frequency. It has been tried to keep the amplitude of such deflections within suitable limits by means of damping elements constructively attached to the bearing head. However, such damping means influence the above mentioned spherical movability of the bearing housing. Besides, the effectiveness of such auxiliary means is rather limited, especially in connection with large rotors because they are effective on the rotor with a very short lever arm.

OBJECTS OF THE INVENTION

In view of the above, the invention aims at achieving the following objects, singly or in combination:

to overcome the above outlined difficulties in a bearing arrangement for a rotary body as described above, more specifically by providing means through which the natural or resonant frequency of the system comprising the body to be tested as well as the bearing and its mounting may be varied;

to control the resonant frequency or frequencies in such a manner that the passing through resonance peaks is avoided; and to provide adjustable auxiliary mounting means which will act as dampening means and thus provide a counteraction against the increase of the oscillation amplitudes.

SUMMARY OF THE INVENTION

The above objects have been achieved according to the invention by means of auxiliary supporting rods, the supporting effect of which is remote-controllable for temporarily detuning of the system which is capable of vibrating and which comprises the main supporng structure as well as the bearing head. The auxiliary supporting rods are arranged in such a manner in spacial relationship to the main supporting structure that the tumbling or wobbling motions of the bearing head or housing are impeded as little as possible.

In a preferred embodiment according to the invention, the auxiliary supporting rods are anchored at one end thereof to the foundation or base structure of the testing facility in a form or force closing manner. The other end of the auxiliary supporting rods are connected to the bearing housing or head by means of a controllable friction coupling. Thus, if a predetermined and adjustable friction force is exceeded the frictional coupling will slip but still subject to substantial frictional losses, whereby energy will be withdrawn from the system and a respective damping applied thereto, whereby, as mentioned, the oscillation amplitudes are prevented from growing into a dangerous range.

BRIEF FIGURE DESCRIPTION

In order that the invention may be clearly understood, it will now be described, by way of example, with reference to the accompanying drawings, wherein.

DETAILED DESCRIPTION OF EXAMPLE EMBODIMENTS

Figure 1:
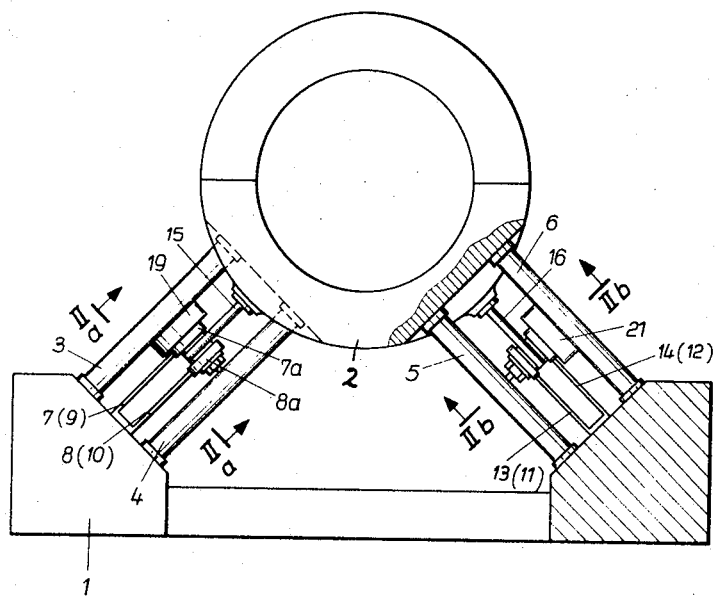
FIG. 1 is a plan front view of one bearing with its mounting of a balancing machine, whereby the right-hand part of FIG. 1 is shown partially in section.

Referring to FIG. 1, the base or foundation 1 comprises two lateral blocks with inwardly and upwardly facing surfaces to which the lower ends of the main bearing supporting rods 3, 4, 5, and 6 are rigidly attached as by bolts or welding. The upper end of these rods is rigidly attached to the bearing head or housing 2. The rods 3 and 4 form one pair whereas the rods 5 and 6 form another pair of the main supporting structure. These pairs are arranged in a common plane which extends through the center of the bearing head 2 and perpendicularly to the bearing main axis which coincides with the rotational axis of the body to be tested. The surfaces of the supporting blocks which face upwardly and inwardly are slanted in such a manner that the two pairs of rods are arranged at right angles relative to each other. It will be noted that the above mentioned plane in which the rods 3 to 6 are located is a radial plane relative to the bearing main axis. In addition to the just described main supporting rods 3 to 6, there are provided, according to the invention auxiliary supporting rods 7 to 14. Preferably, these auxiliary rods are also arranged in pairs. However, the invention is also operable with single auxiliary rods. The lower ends of the auxiliary rods are, for example, bolted to the base 1. These auxiliary rods are arranged at equal spacings relative to and on both sides of the plane is which the main supporting rods 3 to 6 are located. Since the right-hand half of FIG. 1 is shown in section, it will be appreciated that the left-hand side of FIG. 1 shows the auxiliary supporting rods 7 and 8 which are located in front of said common plane while the right-hand side shows the auxiliary rods 13 and 14 which are located behind that common plane.

Figure 2A:
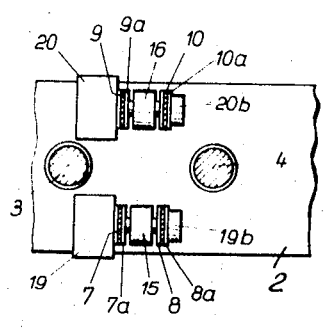
FIG. 2a illustrates a sectional view along line IIa — IIa whereby the section extends below the control means for the auxiliary supporting elements.
Figure 2B:
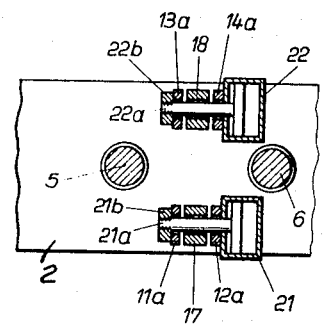
FIG. 2b illustrates a sectional view along line IIb — IIb of FIG. 1, whereby this section extends through the control means for the auxiliary supporting elements.

The pairs of auxiliary rods 7, 8; 9, 10; 11,12; and 13,14 are positioned further approximately intermediate the two respective main rods 3, 4 and 5, 6 and in a plane which extends perpendicularly to said common plane and in parallel between the two respective main rods. The auxiliary rods of a pair form a fork and their upper ends have enlarged surface portions or strips 7a, 8a to 14a which are aligned with each other and spaced from each other to receive therebetween a supporting leg 15, 16, 17, and 18. The enlarged surface end portions 7a, and so on, as well as the lower end of said legs 15 to 18 are provided with respective apertures which are aligned with each other to receive there through the piston rod 19a to 22a as best seen in FIG. 2b. The piston cylinder arrangement 19, 20, 21, and 22 may be rigidly supported at the upper end of one of the auxiliary rods. The outer ends of the piston rods are provided with threads to cooperate with respective nuts 19b, 20b, 21b, and 22b whereby, referring now to FIG. 2b movement of the piston with its rod to the right will clamp the leg 17 or 18 respectively between the respective upper ends of the auxiliary rods whereby these rods are connected through a frictional clutch arrangement between the base 1 and the bearing head 2.

As long as the force transmitted between the leg, for example 15, and the auxiliary rods, for example 7 and 8, does not exceed the frictional force between the just described clutching arrangement, the rotor or rather its bearing will be supported by the stiffness of these auxiliary means in addition to the main supporting rods. However, where these forces exceed the frictional forces, only the latter will be effective and the clutch will slip so to speak. According to the invention, the frictional forces may be controlled by increasing or decreasing the pressure in the respective piston cylinder arrangement 19 to 22, whereby it is possible to vary the critical speed of rotation of the system comprising the body to be tested and the bearing with its mounting structure whereby it is possible to avoid carrying the test through resonance peaks.

Although the invention has been described with reference to specific examples, it is to be understood that it is intended to cover all modifications and equivalents within the scope of the appended claims. In this connection, it is to be noted that instead of eight auxiliary supporting rods it would be possible to employ but two or four of such rods and/or to place these rods in different positions, for example, the auxiliary rods may also be located in the above mentioned common plane in which the main rods 3 to 6 are located.

What is claimed is:

1. In a substantially rigid bearing mounting, comprising a bearing housing defining a bearing center and a bearing main axis extending through said center, base means, spring rod support means for supporting said bearing housing on said base means, said spring rod support means comprising a plurality of bendable spring rods which are rigid with regard to tensile stress, pressure and buckling forces and which are located so as to uniformly restrain said bearing housing against rotation about said main axis and against movement in any radial direction and to permit wobbling motions of a test body supported in said bearing housing about axes extending perpendicularly to each other and through said bearing center, whereby said housing, said test body, said base means and said spring rod support means (3, 4, 5, 6) form a vibratable system, the improvement comprising additional supporting means (7 to 14) arranged between said bearing housing and said base means (1) in such positions as to permit said wobbling motions, said additional supporting means including variable force transmitting means and control means (19, 20, 21, 22) operatively connected to said variable force transmitting means for varying said force transmitting means to temporarily detune said vibratable system.

2. The bearing mounting according to claim 1, wherein said additional supporting means comprise rod means, means for rigidly connecting one end of said rod means to said base means, said variable force transmitting means comprising friction coupling means for connecting the other end of said rod means to said bearing housing.

3. The bearing mounting according to claim 2, wherein each of said rod means comprises a pair of rods the lower ends of which are rigidly connected to said base means and the upper ends of which comprise friction surfaces, said friction coupling means comprising a bar connected with its upper end to said bearing housing and reaching with its lower end between said friction surfaces, and wherein said control means comprise hydraulic piston cylinder means including a piston rod extending through said friction surfaces and through said lower end of said bar, said piston rod having an outer end protruding from said fork and means for securing said outer piston rod end to the adjacent upper rod end for clamping the lower bar end into frictional force transmitting contact with said friction surfaces.

4. The bearing mounting according to claim 1, wherein said plurality of bendable spring rods comprise four spring rods for each bearing housing arranged in pairs, whereby the pairs extend at a right angle relative to each other in said common plane, and whereby the rods of each pair are spaced from each other in said common plane, said additional supporting means comprising rod means arranged on both sides of said common plane at equal spacings therefrom and along a plane extending substantially intermediate and in parallel to the respective pair of spring rods as well as perpendicularly to said common plane.

* * * * *